US011124963B2

(12) United States Patent
Stahl, Jr. et al.

(10) Patent No.: US 11,124,963 B2
(45) Date of Patent: Sep. 21, 2021

(54) CABLE TRAY FIRESTOP DEVICE

(71) Applicant: Specified Technologies Inc., Somerville, NJ (US)

(72) Inventors: James P. Stahl, Jr., Princeton Junction, NJ (US); Paul Gandolfo, Doylestown, PA (US); Neal Janus, Parsippany, NJ (US); Steven Faiello, Morris Plains, NJ (US); Julio Lopes, Melbourne, FL (US)

(73) Assignee: Specified Technologies Inc., Somerville, NJ (US)

( * ) Notice: Subject to any disclaimer, the term of this patent is extended or adjusted under 35 U.S.C. 154(b) by 0 days.

(21) Appl. No.: 16/696,571

(22) Filed: Nov. 26, 2019

(65) Prior Publication Data

US 2020/0165815 A1    May 28, 2020

Related U.S. Application Data

(60) Provisional application No. 62/771,225, filed on Nov. 26, 2018.

(51) Int. Cl.
*F16L 5/04* (2006.01)
*H02G 3/22* (2006.01)
*E04B 1/94* (2006.01)
*H02G 3/04* (2006.01)
*F16L 3/26* (2006.01)

(52) U.S. Cl.
CPC ........... *E04B 1/947* (2013.01); *H02G 3/0412* (2013.01); *H02G 3/0418* (2013.01); *H02G 3/22* (2013.01); *F16L 3/26* (2013.01); *F16L 5/04* (2013.01)

(58) Field of Classification Search
CPC ......... E04B 1/94; E04B 1/947; H02G 3/0412; H02G 3/0418; F16L 5/04; A62C 2/065
USPC ...................................... 52/232, 317, 220.8
See application file for complete search history.

(56) References Cited

U.S. PATENT DOCUMENTS

| | | | | |
|---|---|---|---|---|
| 4,109,423 | A * | 8/1978 | Perrain | A62C 2/065 52/1 |
| 4,273,821 | A * | 6/1981 | Pedlow | C09D 5/185 106/18.11 |
| 4,950,185 | A * | 8/1990 | Boutros | H01R 13/7195 333/183 |
| 5,344,106 | A * | 9/1994 | Beele | A62C 2/06 248/56 |
| 5,452,551 | A * | 9/1995 | Charland | A62C 2/065 52/1 |
| 9,016,017 | B2 * | 4/2015 | Ryden | E04B 1/625 52/220.8 |

(Continued)

*Primary Examiner* — Kyle J. Walraed-Sullivan
(74) *Attorney, Agent, or Firm* — Massina Pat. & TM Law PLLC

(57) ABSTRACT

A firestopping apparatus including a housing defined by first and second housing members. Each housing member includes a width direction wall panel and a height direction wall panel. The width direction wall panel of the first housing member is configured to connect with the height direction wall panel of the second housing member and the width direction wall panel of the second housing member is configured to connect with the height direction wall panel of the first housing member to define an assembled housing with a through passage. Intumescent material is positioned along an inner surface of each wall panel. A compressible foam is positioned within the intumescent material and substantially closes off the through passage.

18 Claims, 12 Drawing Sheets

(56) References Cited

U.S. PATENT DOCUMENTS

| | | | | |
|---|---|---|---|---|
| 2004/0016191 A1* | 1/2004 | Whitty | F16L 5/04 | 52/232 |
| 2004/0016193 A1* | 1/2004 | Stahl, Sr. | H02G 3/0412 | 52/317 |
| 2006/0006611 A1* | 1/2006 | Foerg | A62C 2/065 | 277/602 |
| 2006/0060369 A1* | 3/2006 | Hemingway | H01H 13/04 | 174/58 |
| 2006/0082137 A1* | 4/2006 | Muenzenberger | H02G 3/22 | 285/124.5 |
| 2006/0102369 A1* | 5/2006 | Milani | H02G 3/185 | 174/481 |
| 2006/0265980 A1* | 11/2006 | Vaughan | E04G 15/061 | 52/220.8 |
| 2007/0169963 A1* | 7/2007 | Beele | F16L 5/04 | 174/650 |
| 2007/0175649 A1* | 8/2007 | Moselle | A62C 2/065 | 174/50 |
| 2011/0041432 A1* | 2/2011 | Colwell | H02G 3/22 | 52/220.8 |
| 2011/0088917 A1* | 4/2011 | Lee | F16L 5/14 | 169/45 |
| 2014/0138920 A1* | 5/2014 | Munroe | H02G 3/22 | 277/606 |
| 2014/0260016 A1* | 9/2014 | Langille | F16L 5/04 | 52/232 |
| 2015/0047276 A1* | 2/2015 | Gandolfo | H02G 3/22 | 52/220.8 |
| 2017/0232281 A1* | 8/2017 | Rakic | F16L 5/02 | 169/43 |
| 2017/0354836 A1* | 12/2017 | Lopes | F16L 5/04 | |
| 2018/0015314 A1* | 1/2018 | Muenzenberger | H02G 3/0412 | |
| 2018/0058682 A1* | 3/2018 | Treloar | F22B 37/105 | |
| 2018/0112803 A1* | 4/2018 | Muenzenberger | F16L 5/04 | |
| 2018/0123333 A1* | 5/2018 | Mechler | H02G 3/22 | |
| 2018/0345059 A1* | 12/2018 | Hulteen | A62C 2/065 | |
| 2019/0305539 A1* | 10/2019 | Schulz-Hanke, Sr. | F16L 5/025 | |

* cited by examiner

CABLE TRAY FIRESTOP DEVICE

This application claims the benefit of U.S. Provisional Application No. 62/771,225, filed Nov. 26, 2018, the contents of which are incorporated herein by reference.

FIELD OF THE INVENTION

The invention generally relates to apparatus for providing a firestop within a construction opening and, more particularly, to a firestopping apparatus configured to be positioned about a cable tray and having intumescent pads that form a confinement area about penetrating members passing through the construction opening.

BACKGROUND OF THE INVENTION

It is commonplace in the construction and renovation of commercial and residential buildings for the need to pass cables, conduits and the like through construction barriers such as walls, floors and ceilings. In some instances, the cables are supported on a cable tray which extends through the construction barrier. The cable tray 204 is typically an elongate support structure having a support surface 206 with a pair of side walls 208 to define a generally rectangular U-shape cross-section (see FIG. 4). A cable passage area 209 is defined within the U-shaped cross-section. Cable trays may have varying widths and heights.

As with other cable passages, the cable tray creates an opening through the barriers which raises a potential hazard in that a fire can use those opening to pass through the construction barrier, which of itself is an effective fire barrier, and the fire can then spread to adjoining areas of the building. As such, fire barriers are normally located within or about the cable trays and are designed to prevent the passage of fire through those openings.

Common methods to firestop cable trays include conventional firestop products such as mortars, sealants, pillows, bags, or blocks. The problem with conventional systems is the removal and non-replacement of materials, leaving the opening compromised. Additionally, such conventional systems can be time consuming to install.

Accordingly, there is a need for a firestopping apparatus that may be utilized to provide adequate firestopping about a cable tray extending through a barrier opening.

SUMMARY OF THE INVENTION

In at least one embodiment, the present invention provides a fire stopping apparatus including a housing defined by first and second housing members. Each housing member includes a width direction wall panel and a height direction wall panel. The width direction wall panel of the first housing member is configured to connect with the height direction wall panel of the second housing member and the width direction wall panel of the second housing member is configured to connect with the height direction wall panel of the first housing member to define an assembled housing with a through passage. Intumescent material is positioned along an inner surface of each wall panel. A compressible foam is positioned within the intumescent material and substantially closes off the through passage.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
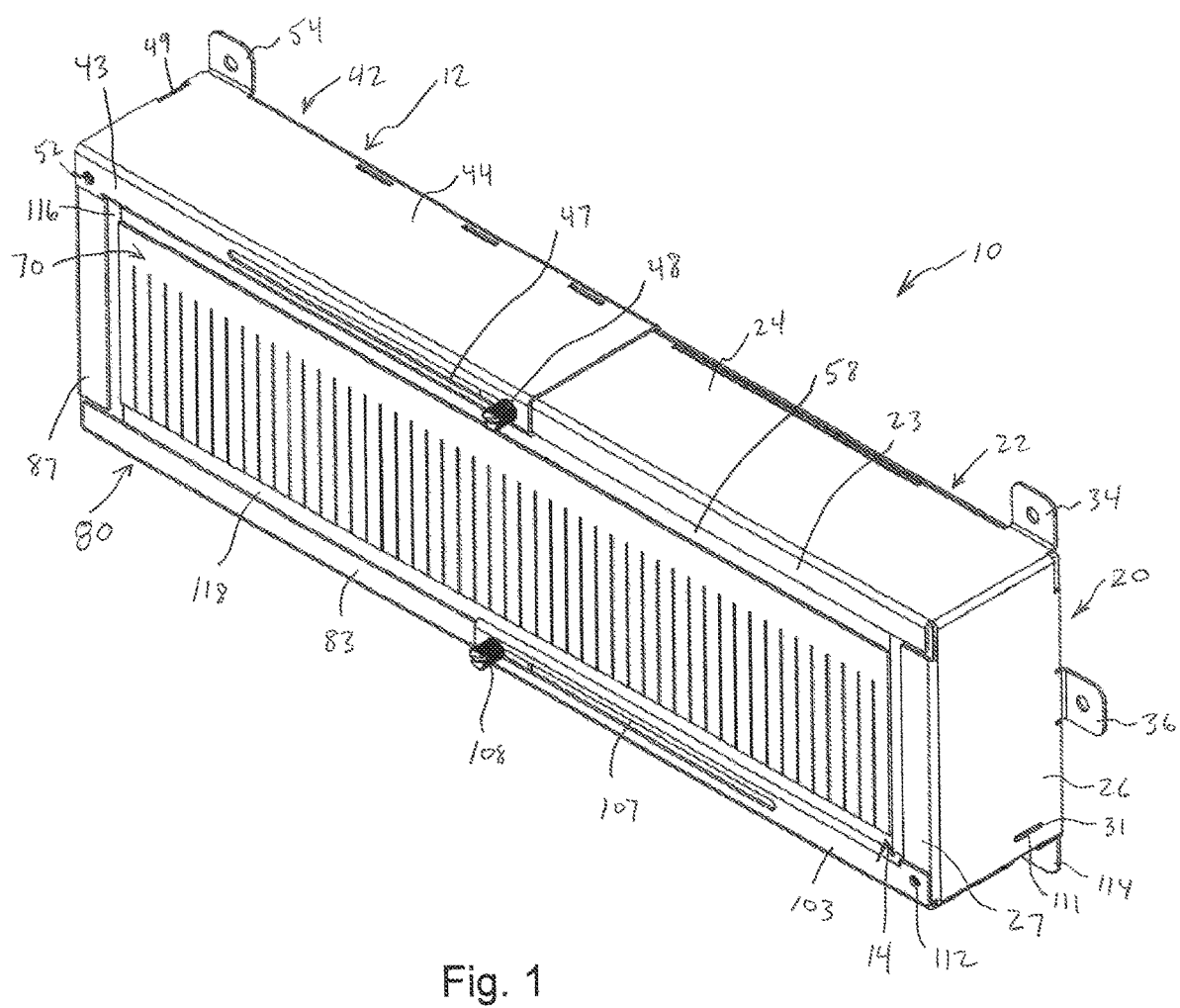
FIG. 1 is a front perspective view of an exemplary firestopping apparatus in accordance with an embodiment of the invention.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-8, a firestopping apparatus 10 in accordance with an exemplary embodiment of the invention will be described. The firestopping apparatus 10 generally comprises first and second housing members 20, 80 that are interconnected to one another to define a housing 12 defining a through passage 14. The housing 12 generally has a rectangular configuration which complements the shape of the cable tray about which the firestopping apparatus 10 is positioned. While the illustrated housing 12 is adjustable in the lengthwise direction to accommodate trays of different widths, the invention is not limited to such. The housing may have a fixed configuration with different sized housing members corresponding to the size of the intended cable tray. Additionally, the housing 12 may be configured to be adjustable in the height direction also.

Figure 2:
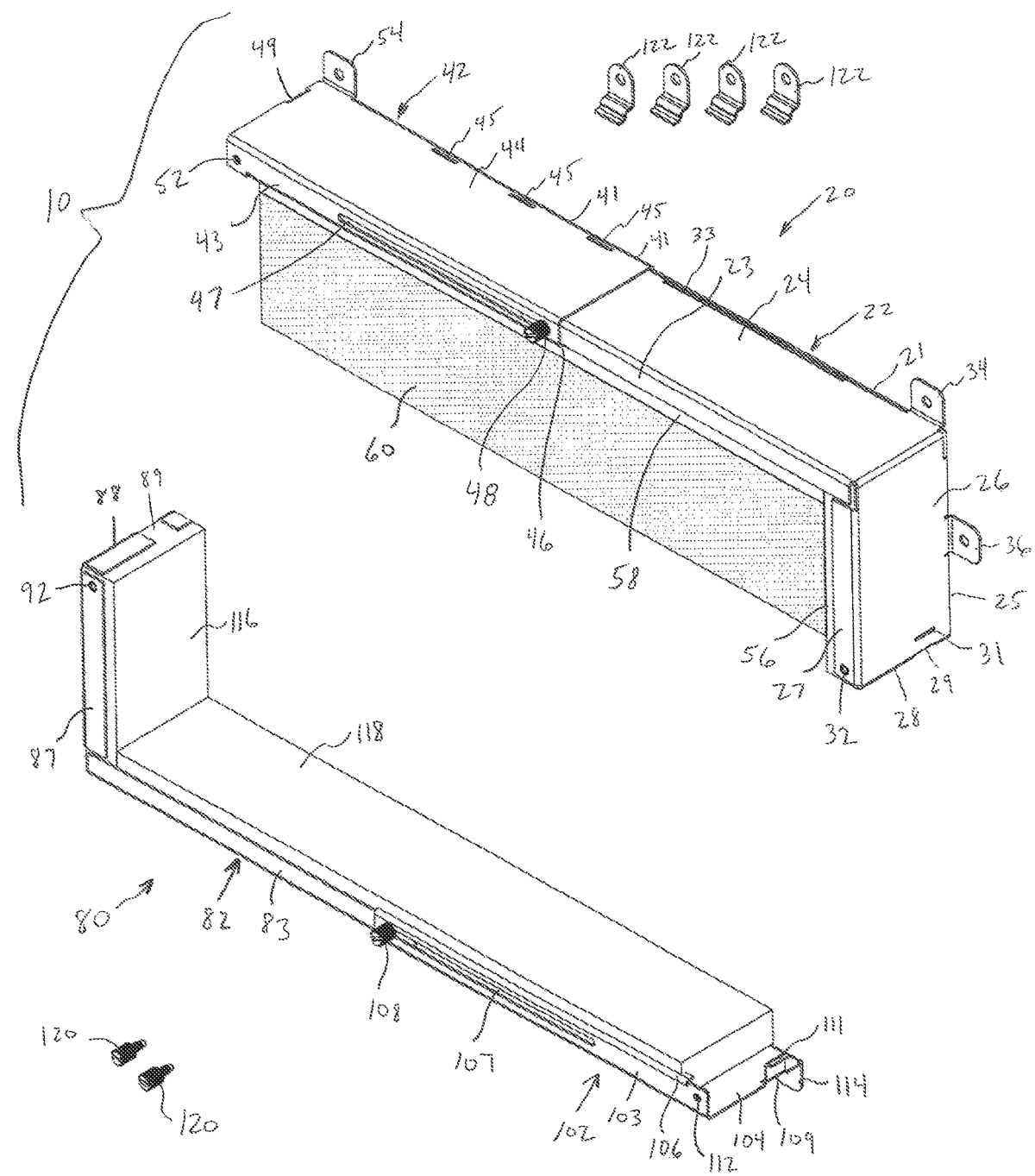
FIG. 2 is a partially exploded perspective view of the firestopping apparatus of FIG. 1 with the gaskets omitted.

The housing members 20, 80 are mirror images of one another. With reference to FIGS. 1 and 2, the first housing member 20 includes a fixed end member 22 with an extension member 42 slidably adjustable relative thereto. In this manner, the position of the extension member 42 relative to the fixed end member 22 defines the width of the housing member 20. The fixed end member 22 includes a first wall panel 24 extending in the width direction of the housing member 20 and a second wall panel 26 at a right angle thereto such that it extends in the height direction of the housing member 20. A rear flange 21 and a front flange 23 depend from the rear and front edges of the first wall panel 24 and a rear flange 25 and a front flange 27 depend from the rear and front edges of the second wall panel 26. An end flange 28 extends from the end of the second wall panel 26 between the flanges 25, 27. The flanges 21, 23, 25, 27, 28 provide rigidity to the fixed end member 22 as well as partially enclose the intumescent pads as will be described hereinafter.

The extension member 42 has a wall panel 44 extending in the width direction of the housing member 20. A rear flange 41 and a front flange 43 depend from the rear and front edges of the wall panel 44. The flanges 41 and 43 are configured to slide along the outer surface of the flanges 21 and 23 of the first wall panel 24. Each of the flanges 41, 43 preferably includes a return 46 which locks the extension member 42 onto the fixed end member 22 but allows sliding longitudinal adjustment. A thumb screw 48 extends through a slot 47 in the flange 43 and is threadably engaged with the flange 23. The slot 47 defines the range of motion of the extension member 42 relative to fixed end member 22. Once the extension member 42 has been slid to a position such that the housing member 20 is a desired width, the thumb screw 48 is tightened to fix the position of the extension member 42 relative to the fixed end member 22.

To facilitate mounting of the housing member 20, a plurality of fixed mounting tabs 34, 36 and 54 extend from the fixed end member 22 and the extension member 42. Additionally, the fixed end member 22 defines an elongate slot 33 and the extension member defines a plurality of slots 45 which are configured to receive additional mounting tabs 122. The fixed end member 22 also defines a tab receiving slot 31 along the second wall panel 26 which is configured to receive a tab 111 extending from a flange 109 on the second housing member 80. An opening 29 is defined in the end flange 28 to allow the flange 109 and tab 111 to pass within the second wall panel 26 and into engagement with the slot 31. The extension member 42 defines a flange 49 with a tab (not shown) which is configured to engage within a tab receiving slot 91 of the second housing member 80. The flanges 27 and 43 define screw receiving holes 32, 52 configured to receive screws 120 which interconnect the first and second housing members 20, 80.

Figure 5:
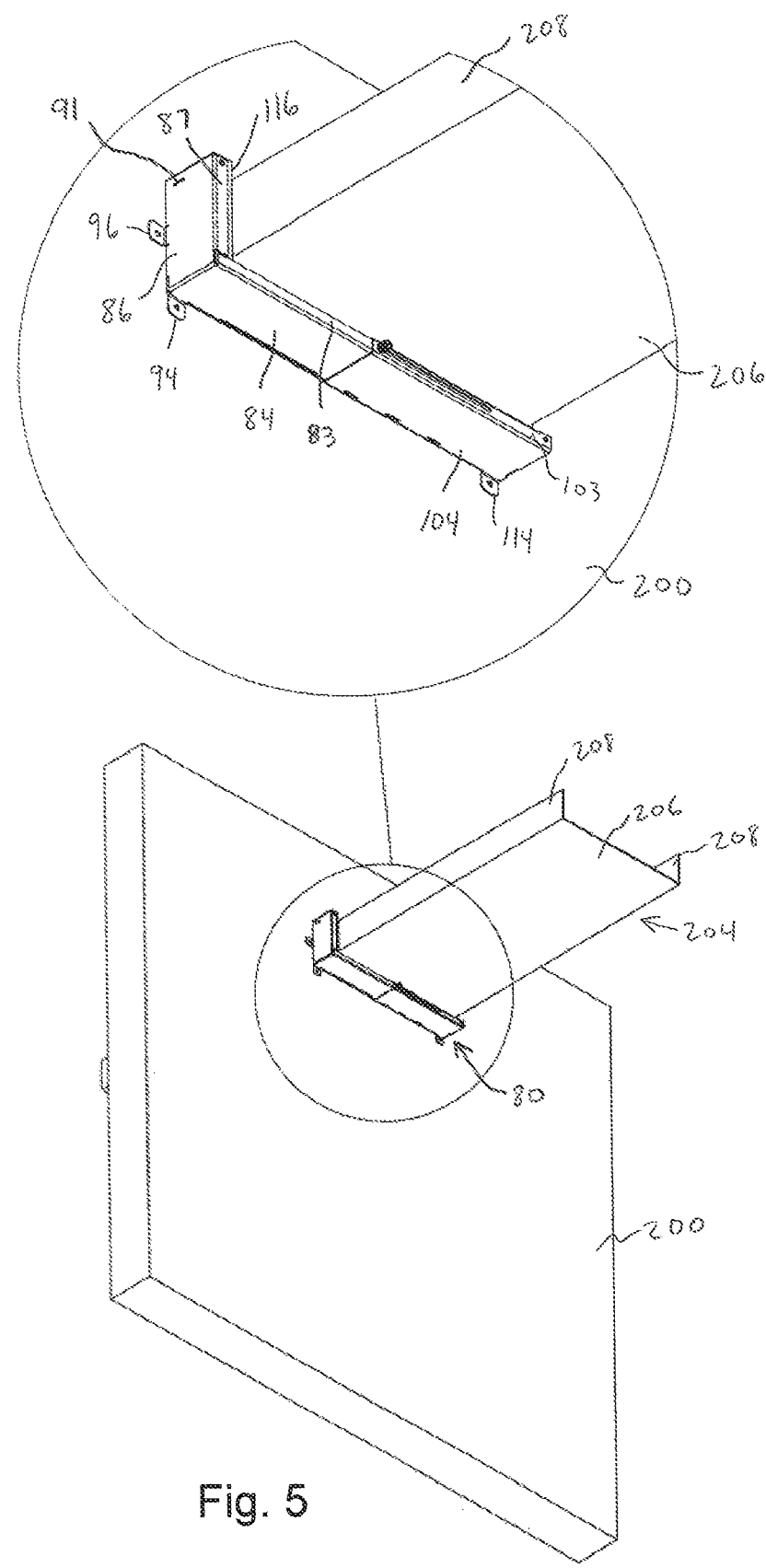

Referring to FIGS. 2 and 5, the second housing member 80 will be described. The second housing member 80 includes a fixed end member 82 with an extension member 102 slidably adjustable relative thereto. In this manner, the position of the extension member 102 relative to the fixed end member 82 defines the width of the housing member 80. The fixed end member 82 includes a first wall panel 84 extending in the width direction of the housing member 80 and a second wall panel 86 at a right angle thereto such that it extends in the height direction of the housing member 80. A rear flange (not shown) and a front flange 83 extend from the rear and front edges of the first wall panel 84 and a rear flange (not shown) and a front flange 87 extend from the rear and front edges of the second wall panel 86. An end flange 88 extends from the end of the second wall panel 86 between the front and rear flanges. The front and rear flanges and the end flange provide rigidity to the fixed end member 82 as well as partially enclose the intumescent pads as will be described hereinafter.

The extension member 102 has a wall panel 104 extending in the width direction of the housing member 80. A rear flange (not shown) and a front flange 103 extend from the rear and front edges of the wall panel 104. The front and rear flanges are configured to slide along the outer surface of the front and rear flanges of the wall panel 84. The front and rear flanges preferably include a return 106 which locks the extension member 102 onto the fixed end member 82 but allows sliding longitudinal adjustment. A thumb screw 108 extends through a slot 107 in the flange 103 and is threadably engaged with the flange 83. The slot 107 defines the range of motion of the extension member 102 relative to fixed end member 82. Once the extension member 102 has been slid to a position such that the housing member 80 is a desired width, the thumb screw 108 is tightened to fix the position of the extension member 102 relative to the fixed end member 82.

To facilitate mounting of the housing member 80, a plurality of fixed mounting tabs 94, 96 and 114 extend from the fixed end member 82 and the extension member 102. Additionally, the fixed end member 82 defines an elongate slot (not shown) and the extension member defines a plurality of slots (not shown) which are configured to receive additional mounting tabs 122. The fixed end member 82 also defines the tab receiving slot 91 along the second wall panel 86 which is configured to receive a tab extending from the flange 49 on the first housing member 20. An opening 89 is defined in the end flange 88 to allow the flange 49 and its tab to pass within the second wall panel 86 and into engagement with the slot 91. The extension member 102 defines the flange 109 with the tab 111 which is configured to engage within the tab receiving slot 31 of the first housing member 20. The flanges 87 and 103 define screw receiving holes 92, 112 which are configured to align with the holes 32, 52 of the first housing member 20 and receive the screws 120 which interconnect the first and second housing members 20, 80.

Referring to FIG. 2, intumescent firestopping material pads 56, 58, 116, 118 are positioned along the inner surfaces of the housing members 20, 80. The pad 56 is sized to extend along the inside surface of the second wall panel 26 of the first housing member 20 between the front and rear flanges and the end flange with the flanges holding the pad in place. Similarly, the pad 116 is sized to extend along the inside surface of the second wall panel 86 of the second housing member 80 between the front and rear flanges and the end flange with the flanges holding the pad in place. The pad 58 is sized to extend along the inside surface of the first wall panel 24 of the fixed end member 22 and the wall panel 44 of the extension member 42 of the first housing member 20 with the front and rear flanges holding the pad in place. Similarly, the pad 118 is sized to extend along the inside surface of the first wall panel 84 of the fixed end member 82 and the wall panel 104 of the extension member 102 of the second housing member 80 with the front and rear flanges holding the pad in place. In the event the width of the first and second housing members 20, 80 is adjusted, the pads 58 and 118 may simply be trimmed to the adjusted length.

The intumescent pads 56, 58, 116, 118 are designed to expand rapidly responsive to fire and heat for the purpose of sealing about the cable tray and any cables/conduits extending through the apparatus 10. The intumescent materials preferably include a foam component chosen of one of various polymers such as polyurethane or silicone or any other polymer which has the capability of forming a soft resilient foam. The intumescent component of the foam may include expandable graphite, sodium silicate or any other commonly used expansion ingredient which is compatible for use with the basic foam carrier construction.

Figure 3:
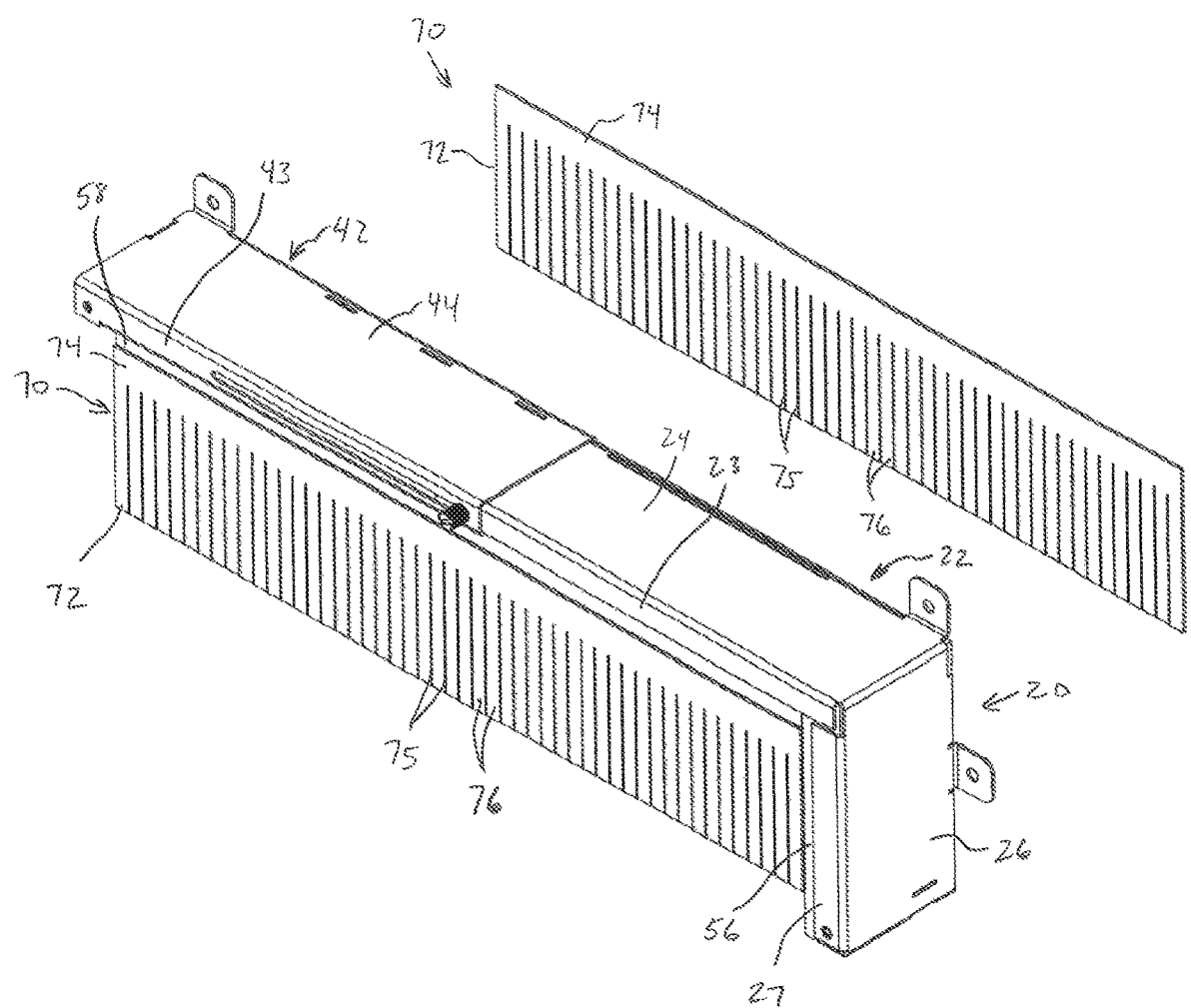
FIG. 3 is a partially exploded perspective view of a first housing member of the firestopping apparatus of FIG. 1.

Referring to FIGS. 2 and 3, to minimize the passage of smoke, air and/or noise along the cable tray 204 and through the passage 14 of the housing 12, a compressible foam pad 60 is attached to either the first or second housing member 20, 80. In the illustrated embodiment, the foam pad 60 is attached to the intumescent pads 56, 58 of the first housing member 20. The foam pad 60 may be attached, for example, with pressure-sensitive adhesive or the like. The foam pad 60 is sized to substantially close off the through passage 14 through the housing 12. In the event the width of the first and second housing members 20, 80 is adjusted, the pad 60 may simply be trimmed to the adjusted length. The foam pad 60 can be cut, slit, compressed or otherwise adjusted to fit about cables or the like in the cable tray. The foam pad 60 is preferably manufactured from a fire-retardant material, for example, Pyrell Foam, however, other materials, including materials which are not fire-retardant themselves, may be utilized.

To further minimize the passage of smoke, air and noise through the passage 14 of the housing 12, a sealing elastomeric membrane 70 extends across the opening 14 along the front and rear of the housing 12. Each sealing membrane 70 includes a planar sheet 72 of elastomeric material. The sheet 72 defines a continuous area 74 along which pressure sensitive adhesive or the like may be applied to attach the membrane 70 to a respective surface of the foam pad 60. A plurality of slits 75 are defined through the planar sheet 72 to define a plurality of adjacent fingers 76. The slits 75 allow cables or the like to pass through between the fingers 76 while the fingers still seal about the cables (see FIG. 7). In the event the width of the first and second housing members 20, 80 is adjusted, each of the membranes 70 may simply be trimmed to the adjusted length.

Figure 4:
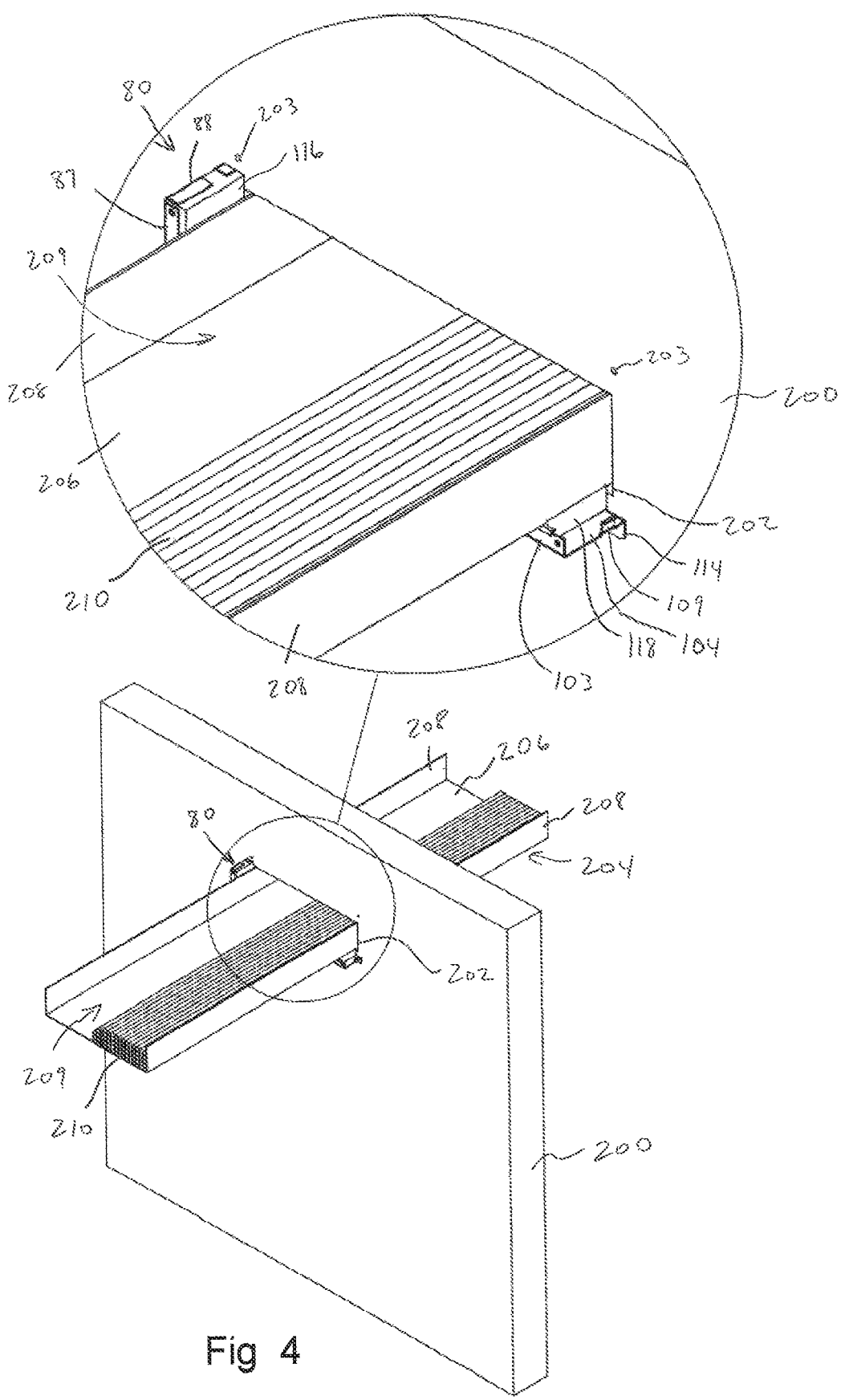
FIGS. 4 and 5 are top and bottom perspective views, respectively, illustrating a second housing member of the firestopping apparatus of FIG. 1 initially installed relative to a cable tray.

Having generally described the components of the exemplary firestopping apparatus 10, installation thereof relative to a cable tray 204 will be described with reference to FIGS. 4-8. As a first step, the width of each of the first and second housing members 20, 80 is adjusted and set to a desired width utilizing the thumb screws 48, 108, as described above. Referring to FIGS. 4 and 5, once the desired width is set, the second housing member 80 is positioned under the cable tray 204 extending through the opening 202 in wall 200. The second housing member 80 is positioned with the pad 118 along the support surface 206 and the pad 116 along one of the side walls 208. The second housing member 80 is secured to the wall 200 using appropriate wall anchor hardware extending through the fixed mounting tabs 94, 96, 114. Predrilled holes 203 which align with the mounting tabs may be utilized.

Figure 6:
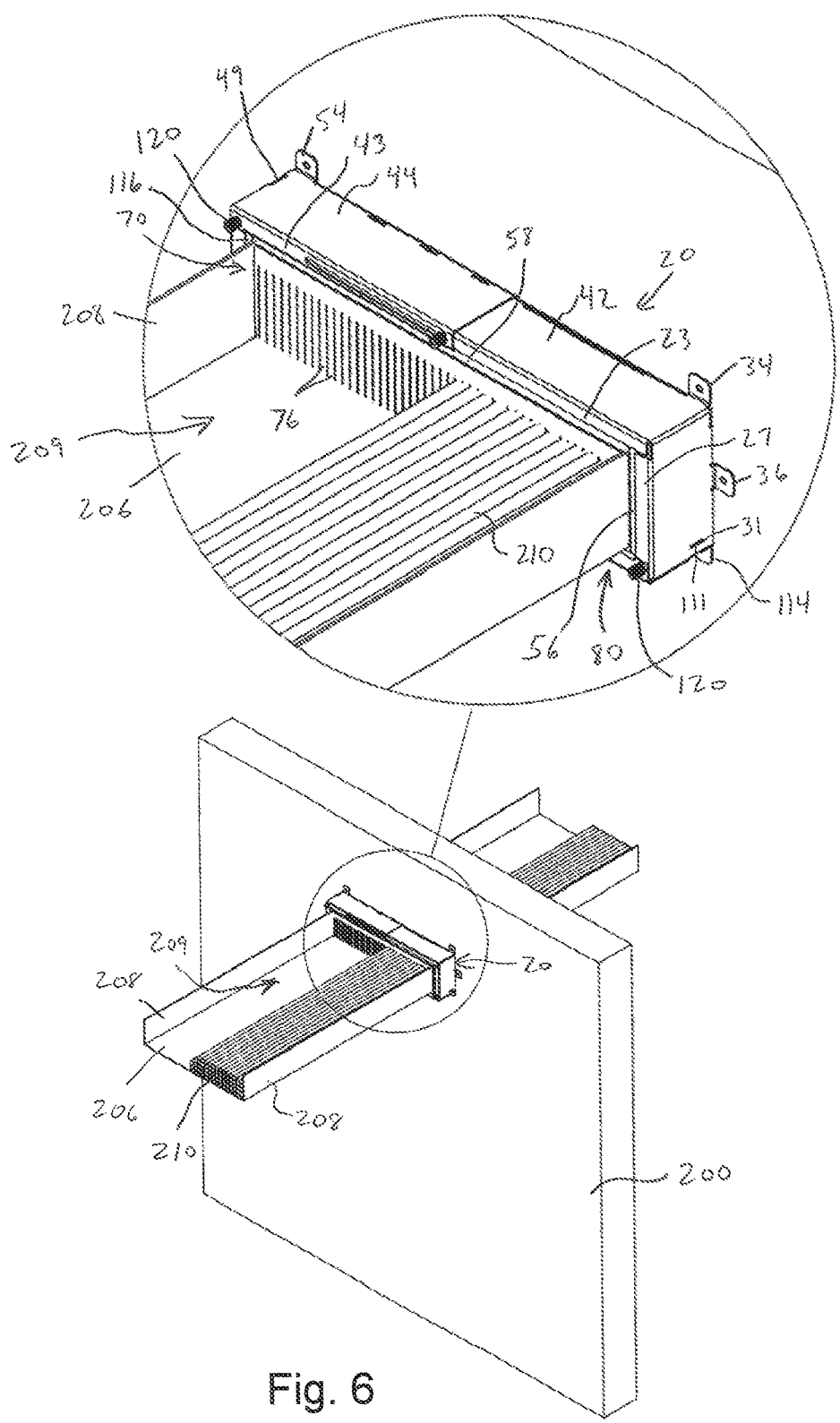
FIG. 6 is a front perspective view illustrating initial installation of the first housing member of the firestopping apparatus of FIG. 1 relative to a cable tray.
Figure 7:
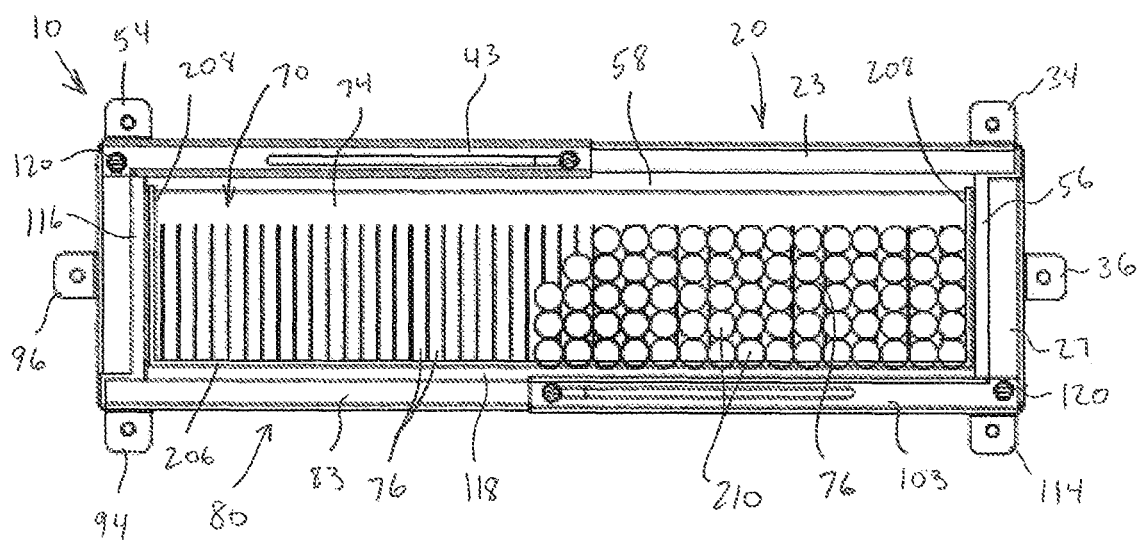
FIG. 7 is a front elevation view of the firestopping apparatus of FIG. 1 after initial installation about a cable tray.

Referring to FIG. 6, the first housing member 20 is then positioned over the cable tray 204. As the first housing member 20 is positioned, the flange 109 and receiving tab 111 extend within second wall panel 26 and the tab 111 is received in the tab receiving slot 31. Similarly, the flange 49 and receiving tab extend within second wall panel 86 and the tab is received in the tab receiving slot 91. The pads 56 and 116 may compress slightly as the flanges 49, 109 move toward the respective slots 31, 91. Once the tabs engage in the slots 31, 91, the screw holes 32 and 112 are in alignment and the screw holes 52 and 92 are in alignment. The housing members 20, 80 are more permanently secured together by securing the screws 120 in the respective screw holes 32, 112 and 52, 92. The housing 12 is in an initially secured configuration, with the pad 56 extending along one of the tray side walls 208, the pad 58 extending above the tray 204 and the foam pad 60 and elastomeric membranes 70 extending into the channel 209 of the tray 204. The foam pad 60 may be slit, cut or compressed to fit about cables 210 or the like within the cable tray 204. The foam pad 60 and the elastomeric membranes 70 compress around the cables and will fill any voids in the cable tray 204 (see FIG. 7).

Figure 8:
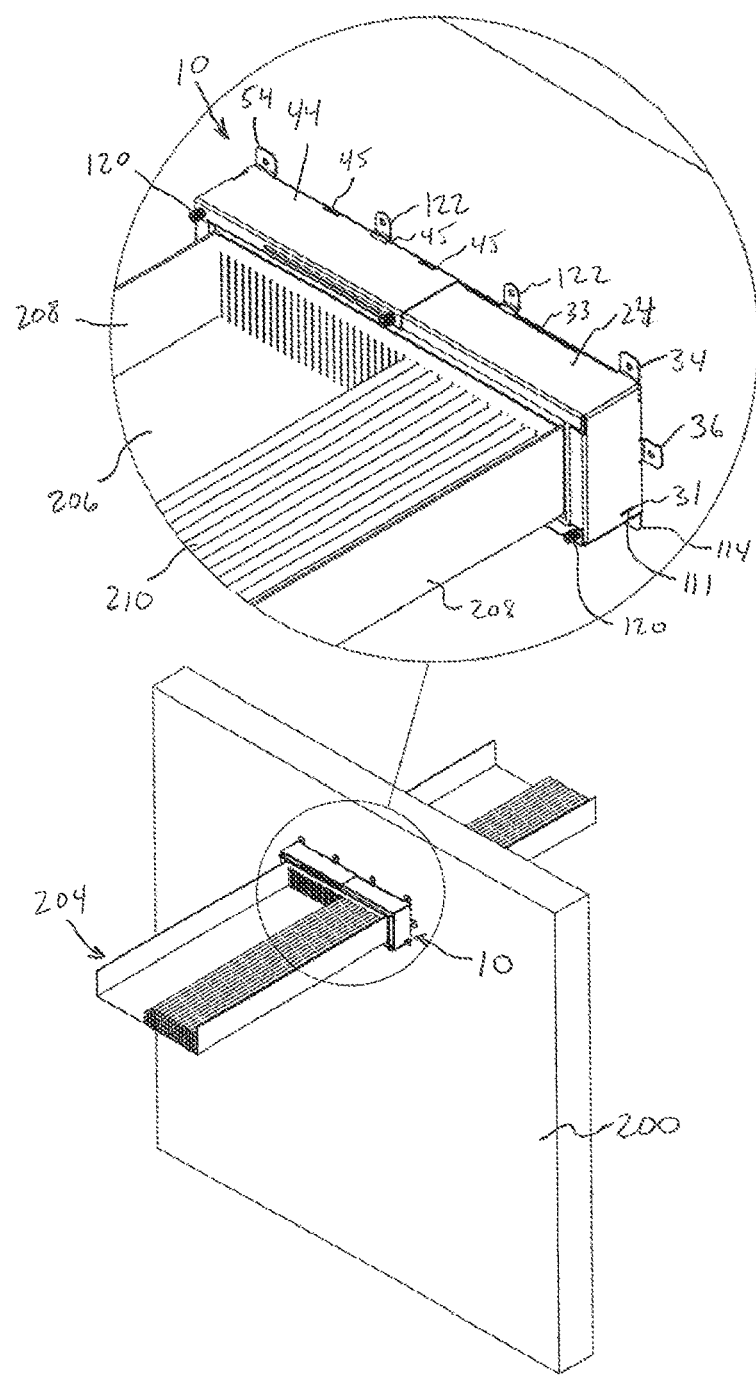
FIG. 8 is a front perspective view illustrating final installation of the firestopping apparatus of FIG. 1 relative to a cable tray.

The first housing member 20 is secured to the wall 200 using appropriate wall anchor hardware extending through the fixed mounting tabs 34, 36, 54. If desired, additional mounting tabs 122 may be positioned within respective slots 45, 33 in the first and/or second housing members 20, 80 and secured to the wall using appropriate wall anchor hardware as shown in FIG. 8. While the firestopping apparatus 10 is illustrated installed on one side of the wall 200, it is recognized that a second apparatus 10 may also be installed on the opposite side of the wall 200. It is noted that the firestopping apparatus 10 can be installed over existing materials or those materials can be removed to allow for additional cables to be routed through at a later date.

Referring to FIGS. 9-15, if the opening 202 through the wall 200 is larger than the size of the housing 12, a closure plate 130 may be utilized to reduce the size of the opening 202 before installation of the firestopping apparatus 10', 10". While the closure plate 130 is described in conjunction with firestopping apparatuses 10' and 10", it is understood the closure plate 130 may be utilized with the firestopping apparatus 10 of the previous embodiment.

With reference to FIGS. 9-12, a firestopping apparatus 10' in accordance with another embodiment of the invention will be described in conjunction with a closure plate 130. The firestopping apparatus 10' is substantially similar to the previous embodiment and only the differences will be described. As in the previous embodiment, the firestopping apparatus 10' includes a housing 12' including interconnected housing members 20' and 80'. The housing member 20' includes a fixed end member 22' with an extension member 42' slidably adjustable relative thereto while the housing member 80' includes a fixed end member 82' with an extension member 102' slidably adjustable relative thereto. In the present embodiment, each extension member 42', 102' defines a wider flange 49' (not shown on second housing member) with a wider tab 51, 111' than in the previous embodiment. Accordingly, the tab receiving slots 31' (not shown on second housing member) on the fix end members 22', 82' have a corresponding wider configuration to accommodate the wider tabs 51, 111'. In addition to the wider configuration, the tabs 51, 111' also have a larger length than in the previous embodiment to extend further through the slots. A further difference in the housing 12' relative to the previous embodiment is that each end wall panel 26', 86' includes a hole 37 (only one shown) for a ground screw (not shown). In other aspects, the housing 12' is substantially the same as in the previous embodiment.

In the fire apparatus 10', the foam pad 60' also has a different configuration than in the previous embodiment. In the present embodiment, the foam pad 60' is comprised of three pads 61, 62, 63. In the illustrated embodiment, pads 61 and 62 are foam pads similar to pad 60 in the previous embodiment. Providing two separate pads 61, 62 which may or may not be interconnected, provides additional flexibility in positioning the pads 61, 62 about the cables or the like in the cable tray. The pad 63 of the present embodiment is an intumescent pad similar to pad 58 in the previous embodiment. The pad 63 is preferably interconnected between the pad 58 and the pad 61 via pressure-sensitive adhesive or the like. It is also contemplated that the intumescent pads 58 and 63 could be formed as a single unitary pad.

Figure 10:
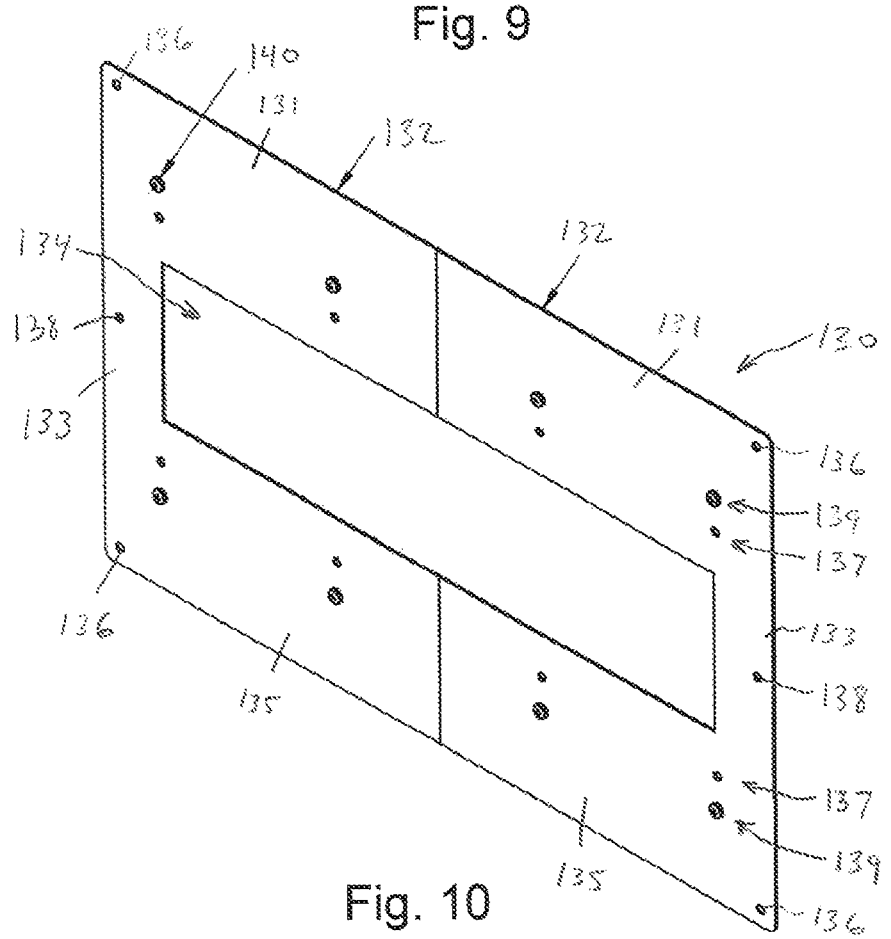
FIG. 10 is a front perspective view of a closure plate of the firestopping apparatus of FIG. 9.
Figure 11:
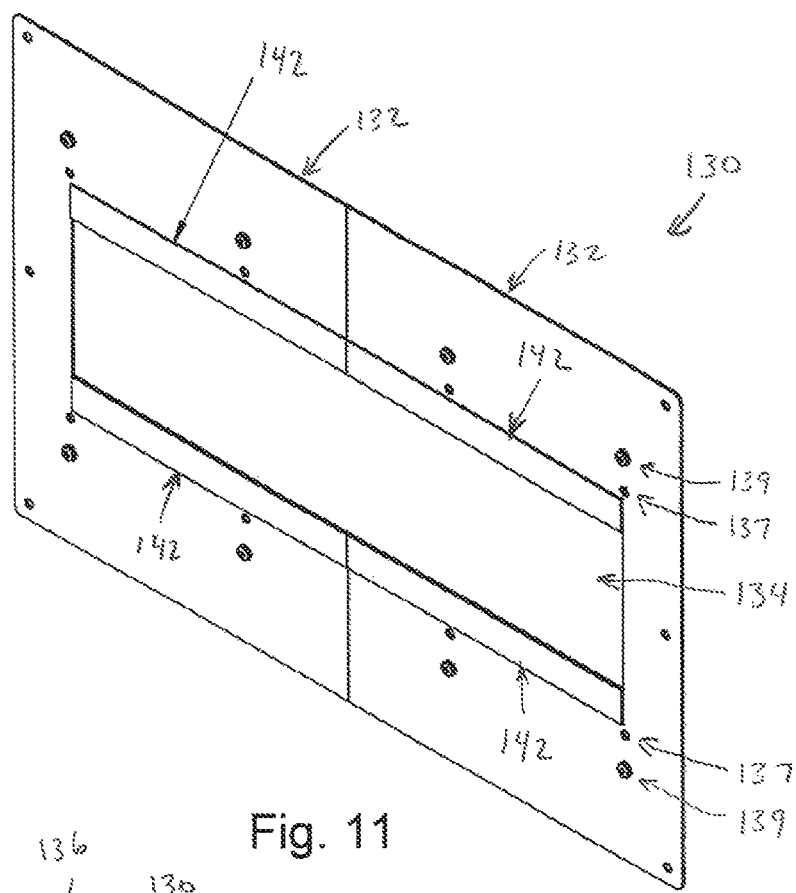
FIG. 11 is a front perspective view similar to FIG. 10 illustrating intumescent gasket members applied to the closure plate for the firestopping apparatus of FIG. 13.

An illustrative closure plate 130 is illustrated in FIGS. 10 and 11. The illustrated closure plate 130 comprises two plate members 132 which are secured relative to one another to define the closure plate 130. Each plate member 132 includes opposed legs 131, 135 and a connecting member 133 to define a U-shape. When the plate members 132 are secured relative to one another in an assembled condition as illustrated in FIG. 10, they define a through slot 134 configured for passage of the cable tray 204. With the two-piece configuration, each member 132 can be slid around the cable tray 204 from each side thereof. Once the plate members 132 are positioned around the tray 204, mounting screws (not shown) may be inserted through the mounting holes 136 in each of the plate members 132 to secure the plate members 132 to the wall 200. If the tray 204 is narrower, the legs 131, 135 of one or both of the plate members 132 may be cut to narrow the width of the through slot 134 prior to mounting of the plate members 132. The plate members 132 are preferably manufactured from steel or other generally rigid, fire-resistant materials. While the illustrated a closure plate includes a single through slot, it may define multiple though slots such that it may be utilized with multiple cable trays within the same wall opening.

Referring to FIG. 10, the closure plate 130 defines a plurality of screw receiving holes 137, 138 and 139 configured to receive screws passed through the mounting tabs 34, 36, 54, 94, 96, 114 and 122. Receiving holes 138 are positioned on either end of the slot 134 and are configured to receive screws passed through the mounting tabs 36 and 96. A pair of inner row of receiving holes 137 are positioned above and below the slot 134 and are configured to receive screws passed through the mounting tabs 34, 54, 94, 114 and 122 of the present embodiment of the firestopping apparatus 10'. The pair of outer rows of receiving holes 139 are configured to receive screws passed through the mounting tabs 34, 54, 94, 114 and 122 of the firestopping apparatus 10" described below with reference to FIGS. 13-15. When utilizing the closure plate 130 with the apparatus 10' of the present embodiment, the receiving holes 139 may have screws 140 positioned therein or otherwise sealed off.

Figure 9:
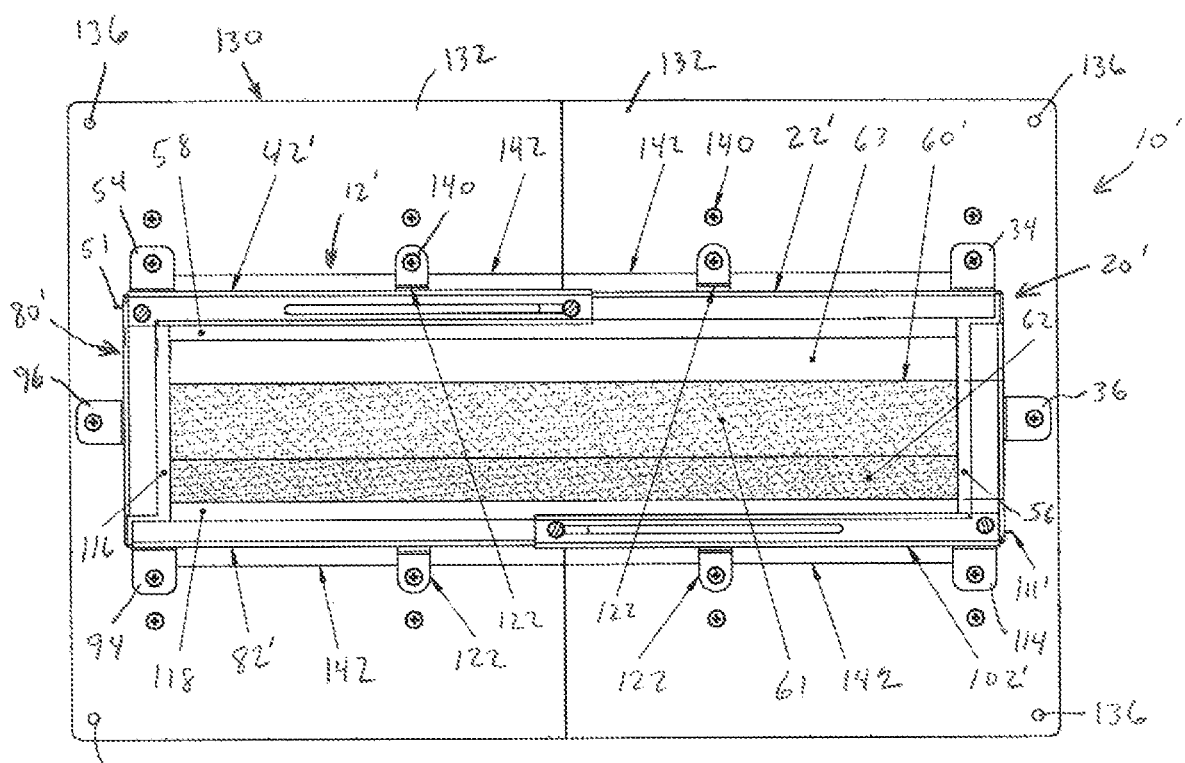
FIG. 9 is a front elevation view of another exemplary firestopping apparatus in accordance with an embodiment of the invention.
Figure 12:
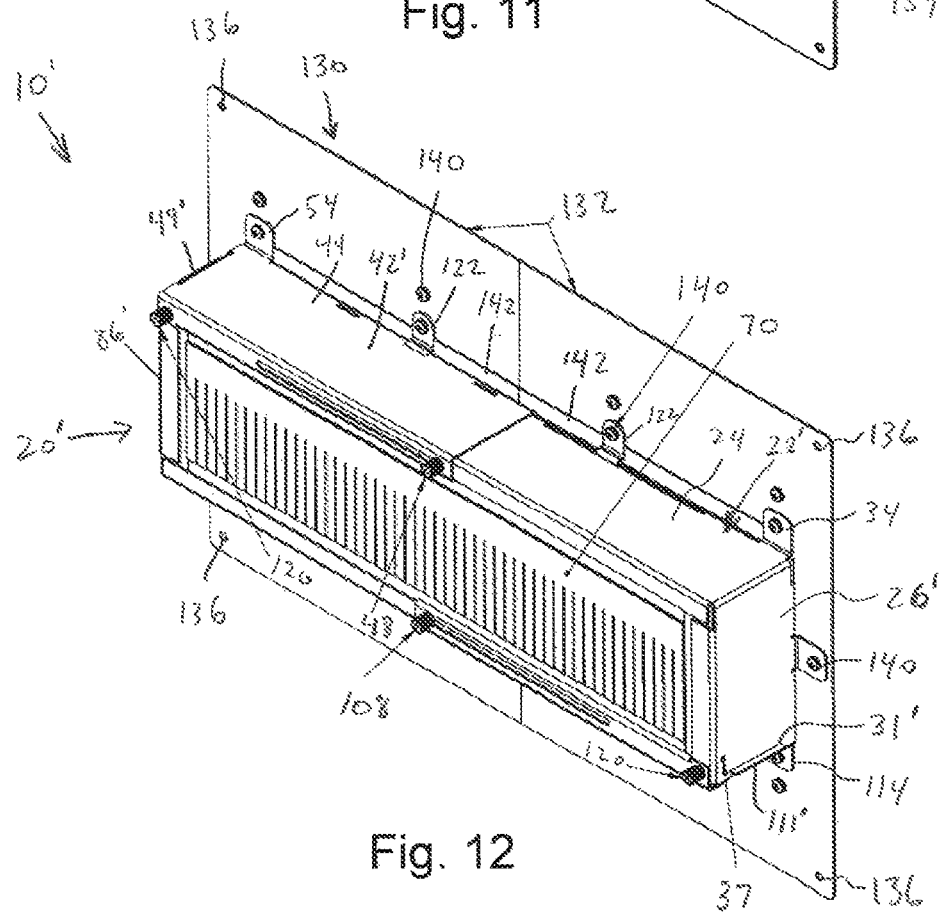
FIG. 12 is a front perspective view of the firestopping apparatus of FIG. 9.

Prior to mounting of the firestopping apparatus 10' to the closure plate 130, gasket members 142 may be positioned along the edges of the through slot 134 to seal between the housing 12' and the closure plate 130. In the illustrated embodiment, a gasket member 142 is positioned along each leg 131, 135 of each plate member 132, however, it is understood that a single gasket member may be provide along the top and bottom edges of the slot 134 after installation of the plate members 132. Additionally, gasket members may be positioned along the connecting members 133. As seen in FIGS. 9 and 12, when the housing 12' is mounted to the closure plate 130, the housing 12' overlies the gasket members 142. The gasket members 142 may be formed from insulation, intumescent material or other materials that provide a desired thermal resistance.

Figure 13:
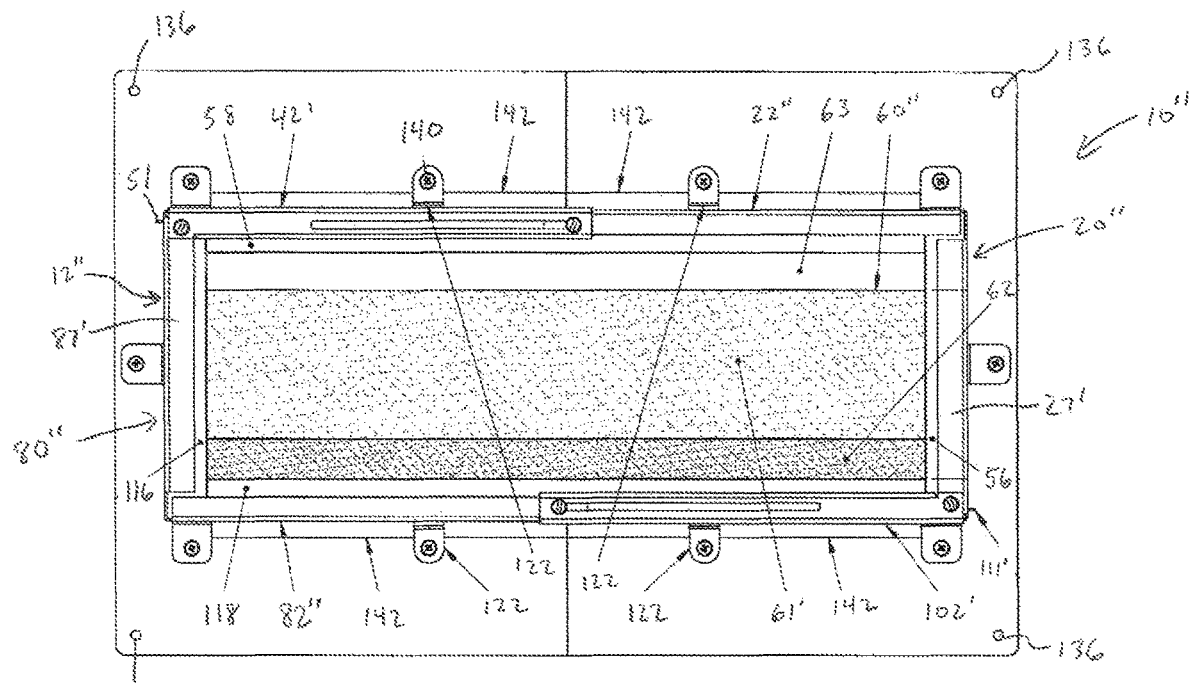
FIG. 13 is a front elevation view of another exemplary firestopping apparatus in accordance with an embodiment of the invention.
Figure 14:
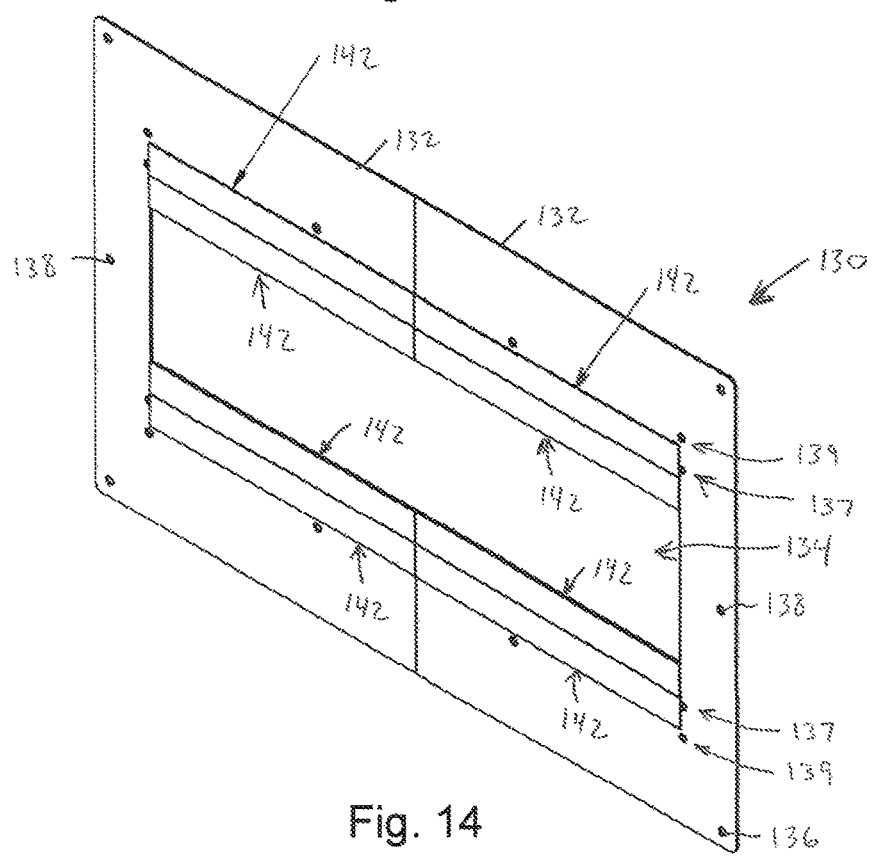
FIG. 14 is a front perspective view similar to FIG. 10 illustrating intumescent gasket members applied to the closure plate for the firestopping apparatus of FIG. 13.
Figure 15:
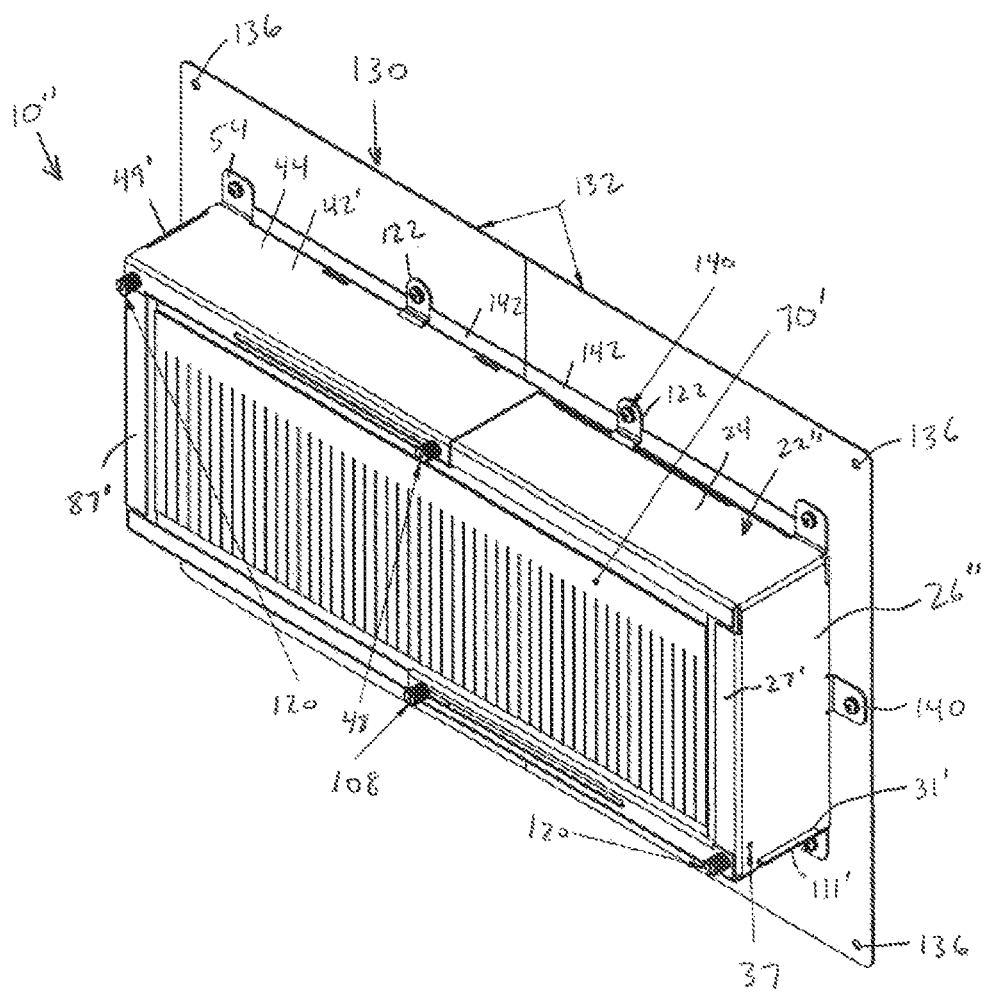
FIG. 15 is a front perspective view of the firestopping apparatus of FIG. 13.

With reference to FIGS. 13-15, a firestopping apparatus 10" in accordance with another embodiment of the invention will be described in conjunction with the closure plate 130. The firestopping apparatus 10" is substantially similar to the previous embodiment and only the differences will be described. As in the previous embodiment, the firestopping apparatus 10" includes a housing 12" including interconnected housing members 20" and 80". The housing member 20" includes a fixed end member 22" with an extension member 42' slidably adjustable relative thereto while the housing member 80" includes a fixed end member 82" with an extension member 102' slidably adjustable relative thereto. In the present embodiment, the housing 12" has a taller configuration than in the previous embodiment. To facilitate such, each end wall panel 26", 86" and the associated flanges 27', 87' have a length which is longer than in the previous embodiment. Additionally, the pad 61' of the foam pad 60" has a height greater than the pad in the previous embodiments. Furthermore, the sealing elastomeric membranes 70' have a height greater than the membranes in the previous embodiment. In other aspects, the firestopping assembly 10" is substantially the same as in the previous embodiment.

As discussed above, the closure plate 130 may be utilized with both firestopping assemblies 10', 10". The outer rows of screw receiving holes 139 are positioned to align with the mounting tabs 34, 54, 94, 114 and 122 of the taller housing 12". Referring to FIG. 14, additional gasket members 142 may be secured to the plate members 132 to provide sealing from the through slot 134 to the outer rows of holes 139. The gasket members 142 cover the inner rows of holes 137 and therefore additional sealing of those holes 137 are not necessary. As seen in FIGS. 13 and 15, when the housing 12" is mounted to the closure plate 130, the housing 12" overlies the gasket members 142. Again, the gasket members 142 may be formed from insulation, intumescent material or other materials that provide a desired thermal resistance.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A firestopping apparatus comprising:
    a housing defined by first and second housing members, each of the first and second housing members including a width direction wall panel and a height direction wall panel wherein the width direction wall panel of the first housing member is configured to connect with the height direction wall panel of the second housing member and the width direction wall panel of the second housing member is configured to connect with the height direction wall panel of the first housing member to define the housing with the width direction wall panels and each height direction wall panels extending about a through passage;
    intumescent material positioned along an inner surface of each width direction wall panel and each height direction wall panel; and
    a compressible foam positioned within the intumescent material and substantially closing off the through passage; and
    wherein a first tab and slot connection extends between the width direction wall panel of the first housing member and the height direction wall panel of the second housing member and a second tab and slot connection extends between the width direction wall panel of the second housing member and the height direction wall panel of the first housing member.

2. The firestopping apparatus according to claim 1 wherein an elastomeric membrane extends along at least a front surface of the compressible foam.

3. The firestopping apparatus according to claim 2 wherein the elastomeric membrane includes a plurality of slits in a height direction.

4. The firestopping apparatus according to claim 3 wherein the slits extend inward from a lower edge of the elastomeric membrane.

5. The firestopping apparatus of claim 2 wherein an elastomeric membrane extends along a rear surface of the compressible foam.

6. The firestopping apparatus according to claim 1 wherein the compressible foam is made from a fire retardant material.

7. The firestopping apparatus according to claim 1 wherein the compressible foam includes more than one compressible foam pads positioned adjacent to one another.

8. The firestopping apparatus according to claim 1 wherein each of the width direction wall panels is adjustable in length.

9. The firestopping apparatus according to claim 8 wherein the intumescent material and the compressible foam may be reduced in length to complement the adjusted length of the width direction wall panels.

10. The firestopping apparatus according to claim 1 wherein the first and second housing members each define a ground screw hole.

11. The firestopping apparatus according to claim 1 wherein a plurality of mounting tabs extend from the housing.

12. The firestopping apparatus according to claim 11 wherein the position of at least one of the mounting tabs is adjustable.

13. A firestopping assembly comprising:
a firestopping apparatus including:
a housing having a maximum height and a maximum width, the housing defined by first and second housing members, each of the first and second housing members including a width direction wall panel and a height direction wall panel wherein the width direction wall panel of the first housing member is configured to connect with the height direction wall panel of the second housing member and the width direction wall panel of the second housing member is configured to connect with the height direction wall panel of the first housing member to define the housing with a through passage having a given area;
intumescent material positioned along an inner surface of each width direction wall panel and each height direction wall panel; and
a compressible foam positioned within the intumescent material and substantially closing off the through passage;
a closure plate including a perimeter structure defined about a through slot, the perimeter structure having height greater than the maximum height and a width greater than the maximum width and the through slot having an area equal to or less than the given area, wherein the housing is configured to be mounted to the closure plate with the through passage aligned with the through slot and the perimeter structure extending outwardly from the housing; and
at least one gasket member positioned on the perimeter structure such that the at least one gasket member extends between the perimeter structure and the housing and wherein the at least one gasket member includes an intumescent material.

14. The firestopping assembly according to claim 13 wherein the at least one gasket member extends along at least a portion of the through slot.

15. The firestopping assembly according to claim 13 wherein each of the width direction wall panels is adjustable in length.

16. A firestopping assembly comprising:
a firestopping apparatus including:
a housing having a maximum height and a maximum width, the housing defined by first and second housing members, each of the first and second housing members including a width direction wall panel and a height direction wall panel wherein the width direction wall panel of the first housing member is configured to connect with the height direction wall panel of the second housing member and the width direction wall panel of the second housing member is configured to connect with the height direction wall panel of the first housing member to define the housing with a through passage having a given area;
intumescent material positioned along an inner surface of each width direction wall panel and each height direction wall panel; and
a compressible foam positioned within the intumescent material and substantially closing off the through passage; and
a closure plate including a perimeter structure defined about a through slot, the perimeter structure having height greater than the maximum height and a width greater than the maximum width and the through slot having an area equal to or less than the given area,
wherein the housing is configured to be mounted to the closure plate with the through passage aligned with the through slot and the perimeter structure extending outwardly from the housing and wherein the closure plate is defined by first and second U-shaped plate members.

17. The firestopping assembly according to claim 16 wherein at least one gasket member is positioned on the perimeter structure such that the at least one gasket member extends between the perimeter structure and the housing.

18. The firestopping assembly according to claim 16 wherein one or both of the first and second U-shaped plate members may be cut to adjust the width of the perimeter structure.

* * * * *